Inventors
Alonson E. Scriven and
Bliss Van Every
By C. A. Nuton
Attorney

Inventors
Alonson E. Scriven
and Bliss Van Every
By C. A. Norton
Attorney

TONE ARM RESTORING MECHANISM FOR DIFFERENT SIZED RECORDS

Filed April 11, 1944 5 Sheets-Sheet 3

Inventors
Alonson E. Scriven
and Bliss Van Every
By
C. A. Norton
Attorney

Inventors
Alonson E. Scriven
and Bliss Van Every
By C. A. Norton
Attorney

April 18, 1950 A. E. SCRIVEN ET AL 2,504,596

TONE ARM RESTORING MECHANISM FOR DIFFERENT SIZED RECORDS

Filed April 11, 1944 5 Sheets-Sheet 5

Inventors
Alonson E. Scriven
and Bliss Van Every
By C. A. Norton
Attorney

Patented Apr. 18, 1950 2,504,596

UNITED STATES PATENT OFFICE 2,504,596

TONE ARM RESTORING MECHANISM FOR DIFFERENT SIZED RECORDS

Alonson E. Scriven, Eggertsville, and Bliss Van Every, Buffalo, N. Y., assignors to Colonial Radio Corporation, Buffalo, N. Y.

Application April 11, 1944, Serial No. 530,480

7 Claims. (Cl. 274—15)

Figures 1, 2:
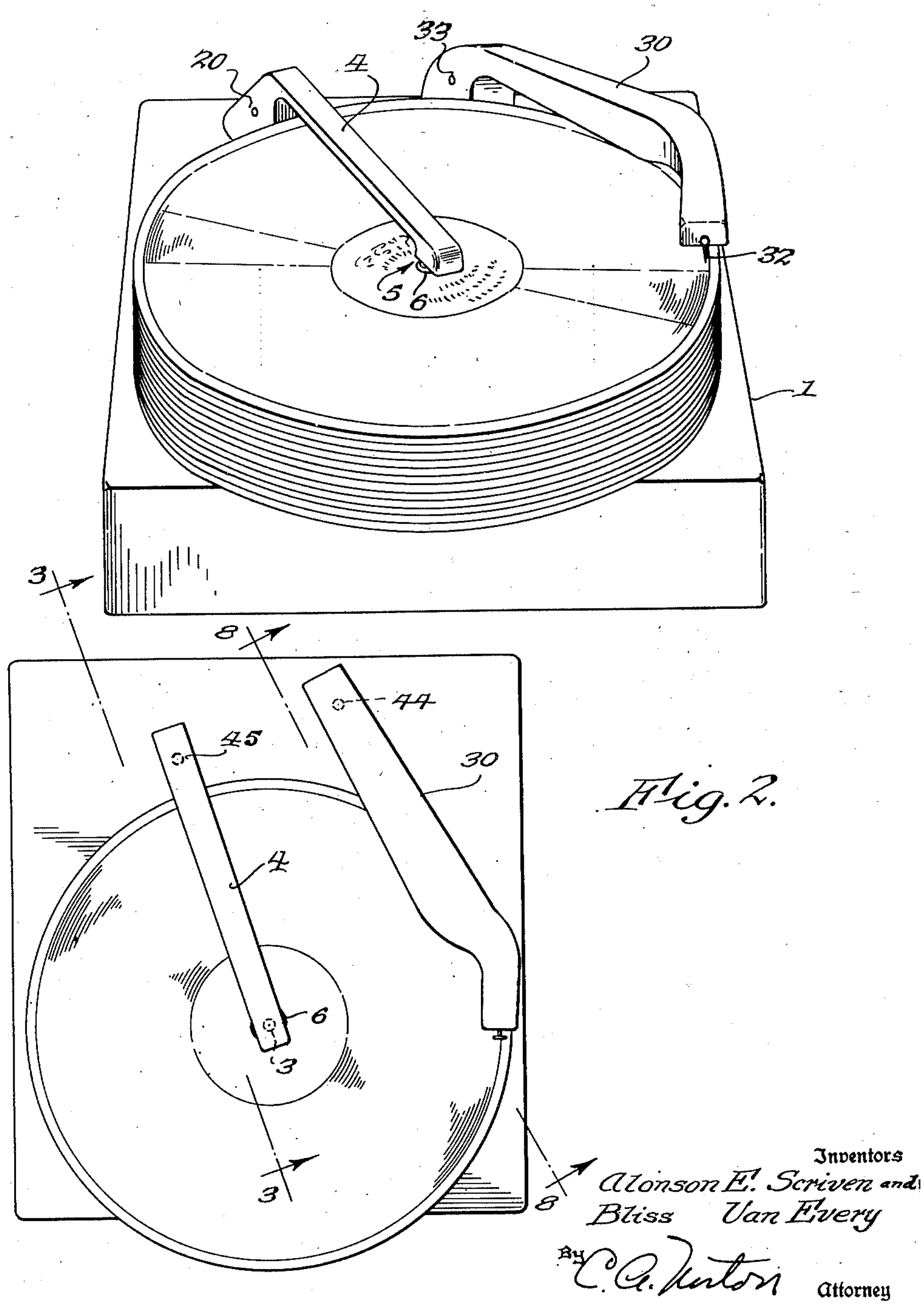

This invention relates to an automatic record changing phonograph of the type playing disk records, and more particularly to new, improved, and simplified mechanism for carrying out the "cycling" process; i. e., the operation which occurs at the completion of the playing of one record to discard the played record and place the pickup arm in position for playing the next record.

For many years it has been recognized as desirable to have mechanism which would automatically reject or discard a record after it has been played and play the next record of a previously selected group of records, without requiring attention on the part of the operator, and many different mechanisms have been proposed and used experimentally and commercially for this purpose.

In the past all such mechanisms with which we are familiar have been very complicated, requiring large numbers of parts, and were, therefore, so expensive to manufacture that many people who desired them were unable to buy them.

In addition, all such mechanisms with which we are familiar are very unreliable in operation and frequently go out of order, and even when mechanically in order are not reliable in operation because of the fact that disk records as commercially manufactured vary in diameter and thickness. Moreover, in use they frequently warp, introducing a variable factor, and the center hole may become enlarged from use; and these, as well as other variable factors, may interfere with the proper operation of the changer mechanism. An example of this is the well-known "slicer" mechanism which drops one record at a time on the turntable from an elevated stack, by the operation of rotary "knives." Such mechanism frequently jams for the reasons given above.

Also, as is well known, records of two diameters are produced commercially; namely, 10" and 12" records, and to provide an automatic phonograph which will play both 10" and 12" records in any order has enormously complicated the mechanisms. Various mechanisms have been suggested, some of which require the operator to make adjustments in the machine to change from 10" to 12" records, and vice versa, and still other mechanisms have been suggested in which "feeler" devices have been incorporated to determine whether the record about to be played is 10" or 12", and to make appropriate adjustments in the mechanism.

Our invention eliminates many of these objections and disadvantages. We have provided a phonograph which will play 10" or 12" records arranged in any order, requiring no adjustment by the operator and no "feeler" mechanism, the tone arm being moved by the record to the proper initial playing position whether or not the record is of 10" or 12" diameter.

Moreover, we have provided a mechanism which will unfailingly discard the played record, and only the played record, after the completion of playing, and regardless of the diameter or thickness of the record, or whether it is truly flat or badly warped, and will play it and discard it properly even though the center hole may be oversize or non-concentric due to wear.

Among the objects of our invention may be mentioned the following:

To provide an automatic phonograph of extreme mechanical simplicity which may be manufactured and sold at a cost considerably lower than the heretofore known machines.

To provide an automatic phonograph in which the record changing operation takes place unfailingly and is not affected by variations in thickness of the record, degree of warp, or the like.

To provide an automatic phonograph in which the pickup arm is carried to initial playing position by the record without any "feeler" mechanism, whether the record is 10" or 12" in diameter, and without any adjustment by the operator.

To provide a generally improved, simplified, more reliable, and less expensive record changing mechanism.

Still other objects and advantages of our invention will be apparent from the specification.

In this application we have particularly pointed out and distinctly claimed the part, improvement, or combination which we claim as our invention or discovery, and we have explained the principles thereof and the best mode in which we have contemplated applying those principles so as to distinguish our invention from other inventions.

Figure 3:
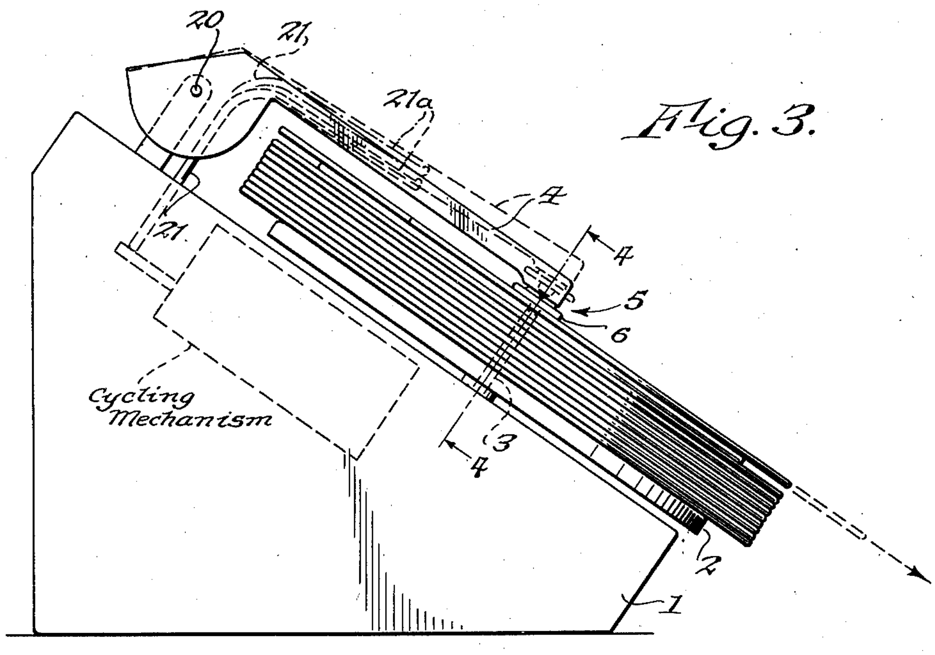
Figures 4, 5, 6, 7:
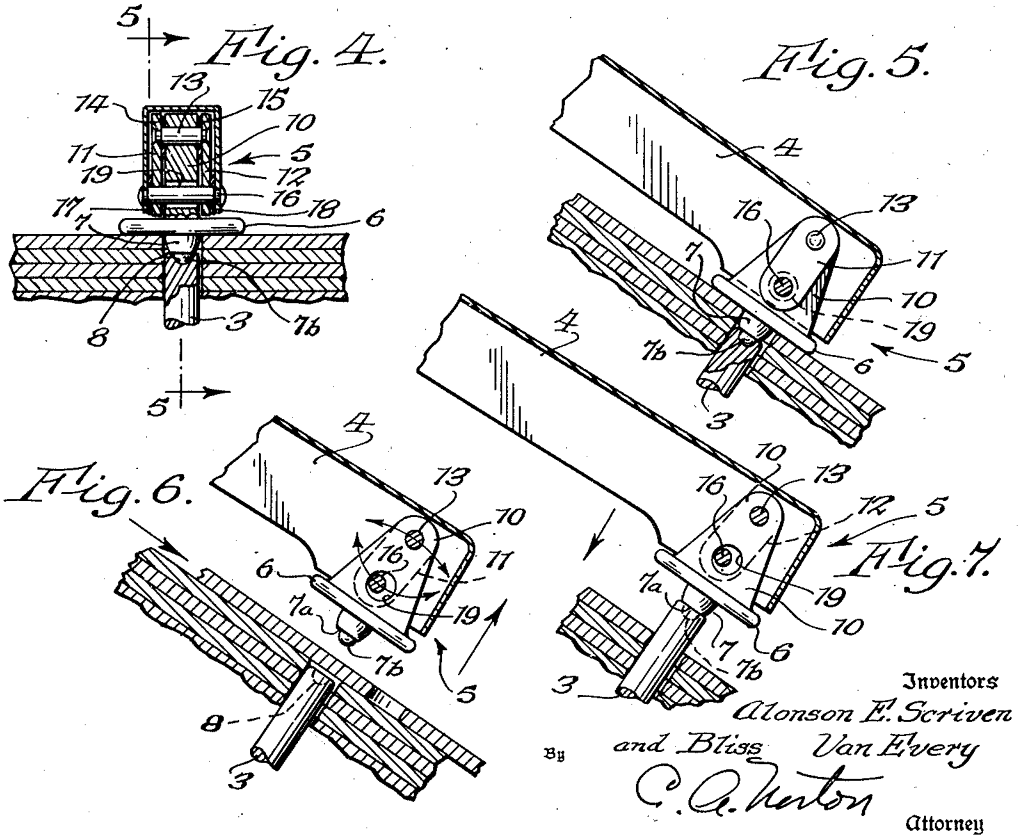
Figures 8, 9, 10:
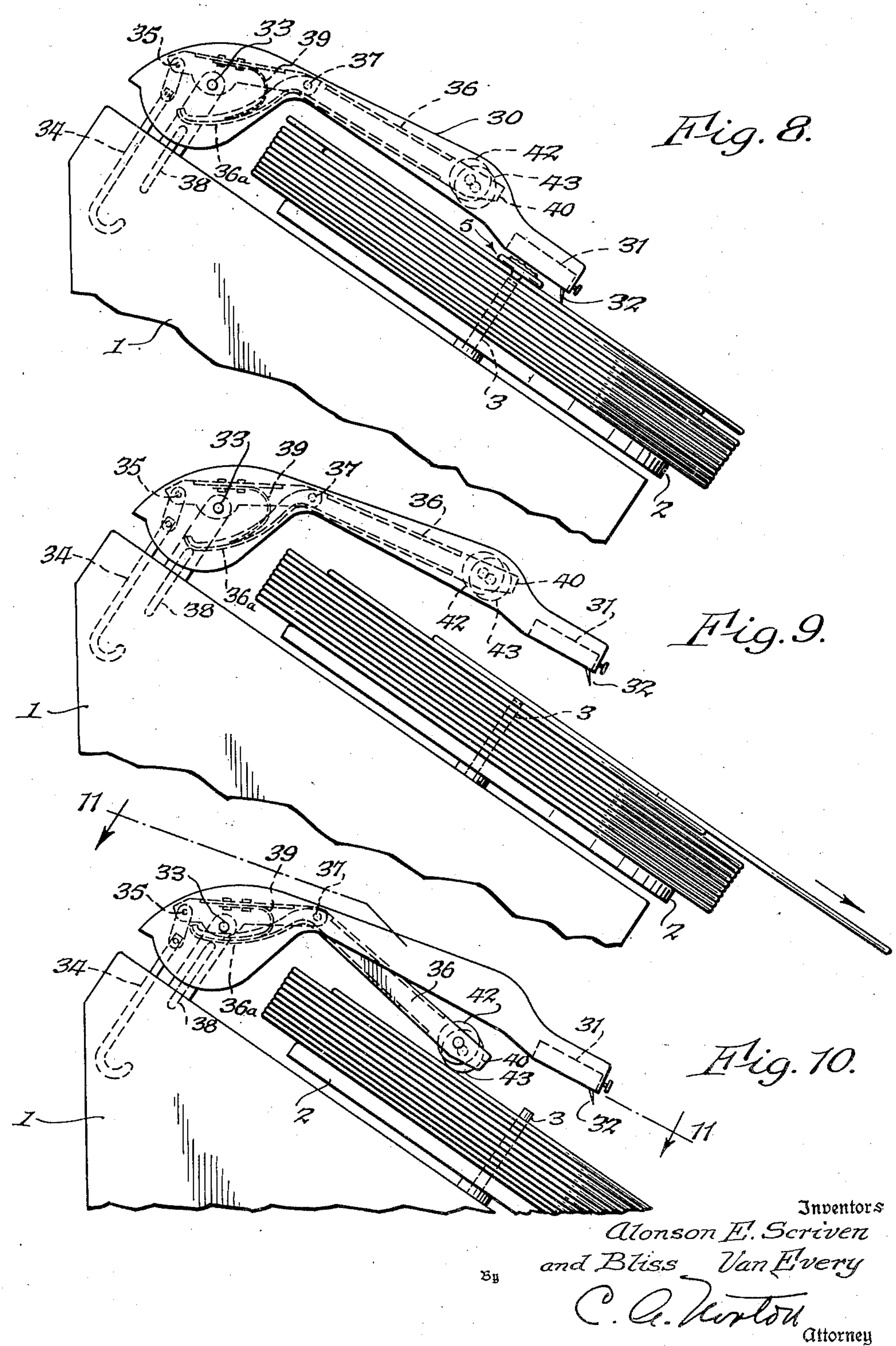
Figures 11, 12, 13:
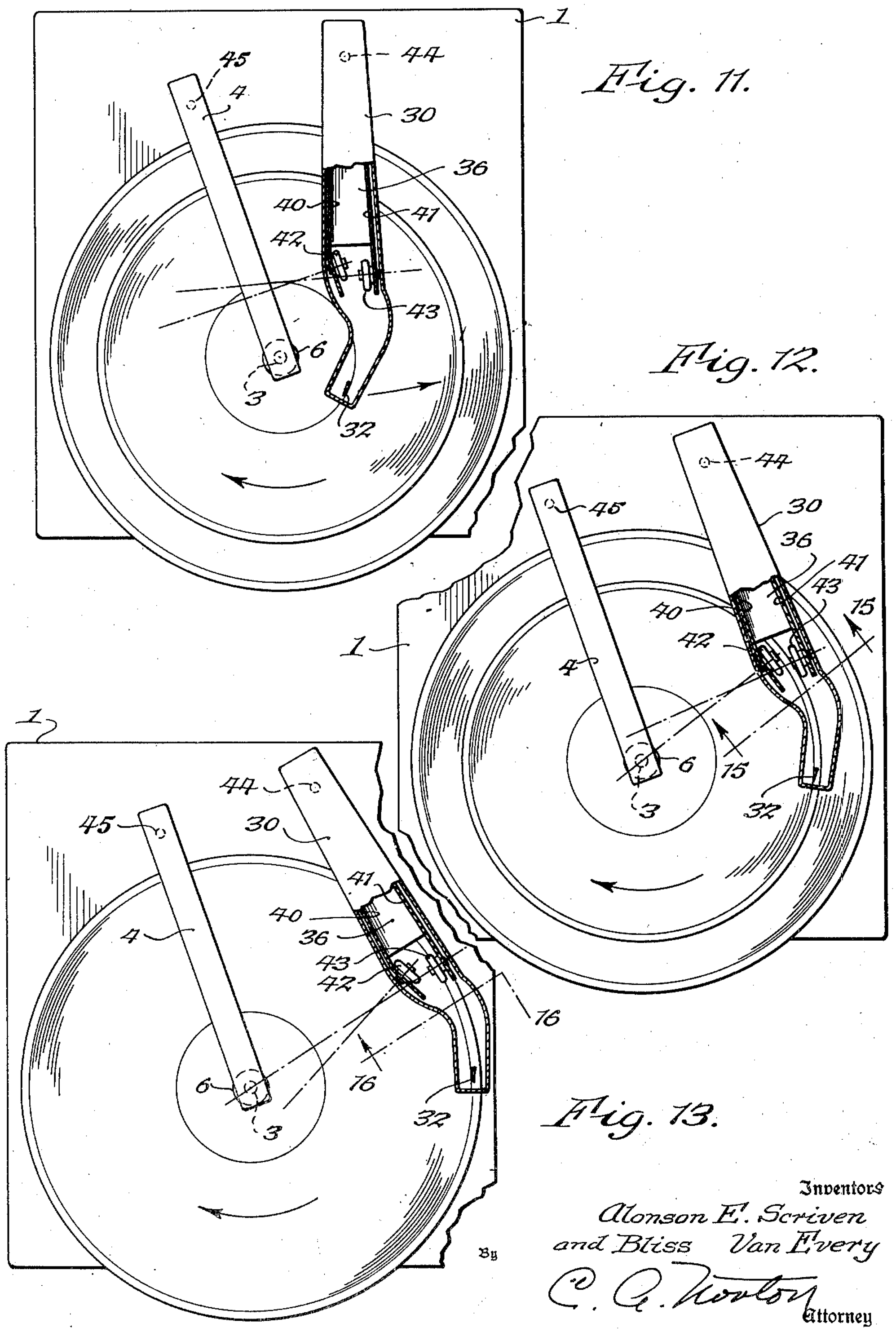
Figure 14:
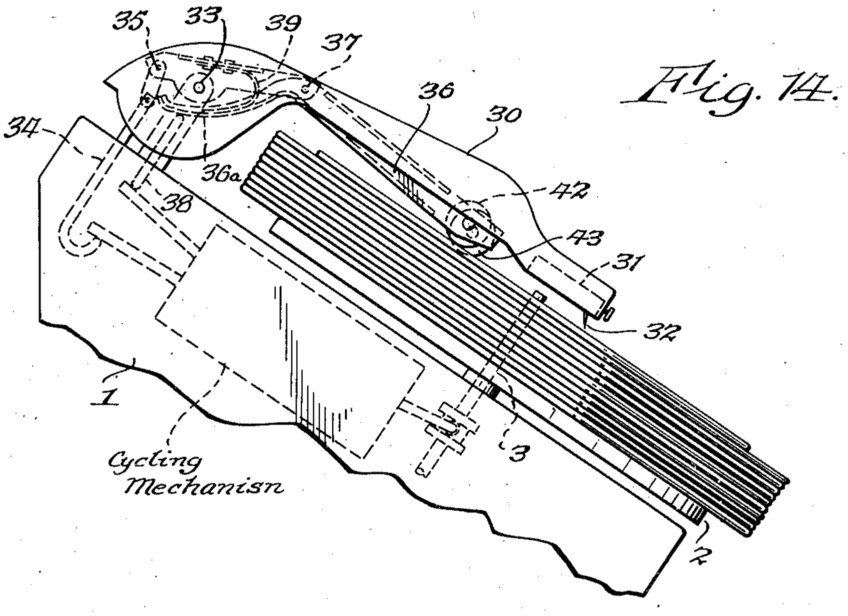
Figure 15:
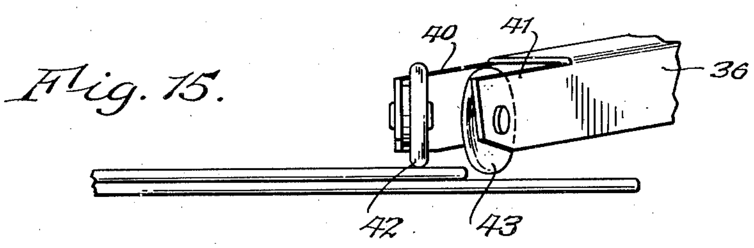
Figures 16, 17:
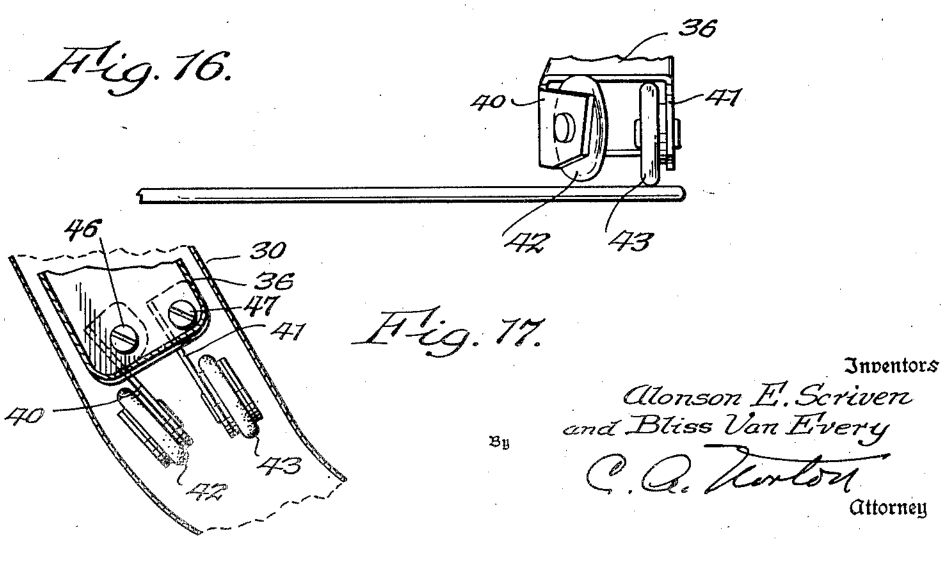

In the drawings,

Fig. 1 is a front view in perspective of a record player in accordance with our invention, Fig. 2 is a plan view taken in the direction of the turntable spindle, Fig. 3 is a side elevation thereof, Fig. 4 is an enlarged sectional view on lines 4—4 of Fig. 3, Fig. 5 is an enlarged sectional view on lines 5—5 of Fig. 4 with the indexing arm in record-playing position, Fig. 6 is a similar view showing the position of the same parts during the act of discarding the record, Fig. 7 is a similar view after the record has been discarded and the parts are returning to playing position, Fig. 8 is a side elevation on lines 8—8 of Fig. 2, showing the mechanism in playing position, Fig. 9 is a similar view showing the mechanism in the position in which a record is being discarded, Fig. 10 is a similar view showing the mechanism in the position it takes at the beginning of the pickup arm swing, Fig. 11 is a plan view, partly broken away, with the mechanism in the position shown in Fig. 10, Fig. 12 is a similar view when the pickup arm is in position to start playing a 10″ record, Fig. 13 is a similar view when the pickup arm is in position to start playing a 12″ record, Fig. 14 is a view similar to Fig. 10, but showing the mechanism in position just before the stylus makes contact with the record, Figs. 15 and 16 are enlarged detail views of the wheel arm in position to start playing a 10″ record and a 12″ record respectively, and Fig. 17 is an enlarged detail plan view of the wheel arm showing a slightly modified form.

In accordance with our invention we prefer to play the records at an angle instead of in the horizontal plane as is usual. The angle is not critical, and need only be enough so that when the records are released by the mechanism to be described, they will slide off into a suitable receptacle or container. We prefer to employ an angle of about 35° with the horizontal.

While we have shown and described, as a part of our invention, the apparatus which restores the pickup arm to initial playing position as applied in a phonograph with the turntable at an angle, it is clear that such mechanism will operate equally well with a phonograph in which the turntable operates in a horizontal plane.

Referring now more particularly to Figs. 1 and 3, 1 designates the cabinet or container within which may be housed the driving and part (not shown) of the cycling mechanism. 2 represents the turntable of usual construction mounted on and carried by spindle 3, which may in turn be driven by any suitable driving motor, such as an electric motor (not shown).

Spindle 3 is longitudinally movable within the turntable 2 and may be arranged to be moved upwardly by a suitable cam in the cycling mechanism. Upon turntable 2 may be mounted a stack of records to be played. These records may consist of 10″ and 12″ records in any desired order or arrangement, and for simplicity of the drawing we have shown a stack of 12″ records with one 10″ record in No. 2 position.

In playing position all of the records except the top one are held in position by spindle 3. The top record is held in position by the head 5 of index arm 4, this arm being pivoted at 20 on a fixed bracket mounted on the case. The index arm 4 may swing upwardly and downwardly around pivot 20 and may be lifted up by a rod 21 moved upward at the proper time by a cam in the cycling mechanism. This rod preferably has a portion 21*a* extending well out into the indexing arm, where it engages the under side of the top of the indexing arm. The index arm 4 may also be arranged to swing clear of the record area, as on pivot 45, to permit manual loading and unloading of records on the turntable.

As the rod 21 moves upwardly, actuated by a cam in the cycling mechanism, the index arm 4 is thereby lifted from the record. When the cam permits, return of index arm 4 occurs due to its own weight, so that it comes to rest upon the top record of the stack whether the stack comprises only one record or a number of records.

The indexing head 5 may consist of a face portion 6, which may be circular, and which rests upon the face of the top record around the center hole. At the center of face 6 there may be provided a rounded or tapered stud 7, arranged to engage the center hole of the record, and this stud is preferably made of somewhat greater length than the thickness of the record.

Just below record thickness there may be provided a flat flange 7*a* and a still further projecting smaller stud 7*b*, the latter engaging in a depression 8 on the top face of spindle 3. It will be understood that because the index arm rotates about pivot 20, if the index head 5 were rigidly attached to the arm 4, the face 6 would not contact evenly with the record.

Therefore, we prefer to pivot the indexing head 5 on the arm 4 by providing an upwardly extending portion 10, which in turn may be pivoted to the upper ends of links 11 and 12 by pivot 13 carrying washers 14 and 15, the links 11 and 12 in turn being pivoted at their lower ends to the side walls of the index arm 4 as by pivot 16, carrying washers 17 and 18, the pivot 16 extending through an opening 19 formed in the upwardly extending arm 10. This opening 19 is preferably made somewhat larger than pivot 16.

This, as will be seen, permits the head 5 to swing on pivot 13, and also about pivot 16 through the action of the arms 11 and 12. With this construction the stud 7 will always enter the center hole of the top record and the face portion 6 will contact the record around its entire periphery. If the weight of the arm 4 is insufficient to hold the record in properly centered position even though the center hole of the record may be enlarged to such an extent that the record could not be satisfactorily played otherwise, a spring (not shown) may be provided to bias arm 4 against the top record.

The first operation of cycling; i. e., the discarding of the played record, may now be understood. When the pickup arm reaches the trip groove that is in the blank center portion of the record, the cycling trip (not shown) is actuated by the tone arm, and the cycling mechanism within the cabinet is put into operation.

The first operation of this mechanism is to lift the pickup arm from the record, as will be described later. The next operation is to lift the index arm 4 from the record, which may be done as previously stated, by moving the rod 21 upwardly by means of a cam or other suitable mechanism, not shown.

As the index arm 4 moves up, the stud 7 clears the center hole of the record, but the spindle 3 remains in its prior position because of friction. At the moment when index arm 4 starts to move upward, the top of spindle 3 lies somewhere between the upper and lower faces of the second record of the stack, this having been determined through the engagement of the face 6 with the top record, by engagement of stud 7*b* with the top of spindle 3, and by the distance of the flat portion 7*a* from the face 6.

As the indexing head 5 clears the top record, nothing holds that record in position, and it will slide off downward without requiring any mechanism to carry it off or to give it a push. The remaining records cannot slide off, however, because of the position of the spindle 3. As the cycling progresses, spindle 3 is then moved upward as by means of a cam in the cycling mechanism, until it reaches the position shown in Fig. 7, where it again engages with the stud 7.

At this point in the cycling operation the upward pressure on rod 21 and spindle 3 is released and the spindle and the indexing arm move down together until the face 6 engages the face of the record now at the top of the stack, and the apparatus comes to rest in the position of Fig. 5.

The number 2 record is now in position to be played, but the pickup arm 30 must be placed in the position shown in Fig. 1. It will be recalled that the first operation of cycling was to lift the pickup arm from the record. The pickup arm may, therefore, be assumed to be in the position shown in Fig. 11, lifted off the record, as in Fig. 9. It is taken to starting position by means which will now be described.

Pickup arm 30 is preferably U-shaped in cross section, with the open side down, and the pickup itself 31 with the stylus or needle 32 may be mounted within the arm at the outer extremity. Leads (not shown) may extend up within the arm and into the cabinet 1 where they may be connected to a suitable amplifier and sound reproducer (not shown).

The pickup arm may be pivotally mounted on a bracket extending from cabinet 1 at point 33, and rod 34 driven by the cycling mechanism may be pivotally connected to pickup arm as at 35, whereby as rod 34 moves downwardly (actuated by a cam in the cycling mechanism), the pickup arm moves in a counterclockwise direction about pivot 33, and the stylus is lifted from the record, as shown in Fig. 9. This is the first movement of the cycle. The pickup arm may also be pivotally mounted as at 44 to swing across the record.

Within the pickup arm 30 we may provide a wheel arm 36 pivoted to the pickup arm as at 37, having a downwardly extending circumferential portion **36*a*, engaged by push rod 38, the projected axis of which intersects the axis of pivots 33 and 44. The circumferential portion 36*a* of the wheel arm has a radius equal to its distance from pivot 33, whereby the raising and lowering of the pickup arm does not affect the operation of the wheel arm by push rod 38**.

The outer extremity of the wheel arm 36 may carry two outwardly extending arms 40 and 41, upon which are mounted for rotating small wheels 42 and 43 respectively. Wheel 42 may be smaller than 43 or may have its axis mounted higher, in such a manner that when wheel 43 is in contact with the record, wheel 42 is held out of contact by a distance less than the minimum thickness of a record. These wheels may be provided with a felt or rubber tread so as not to injure the record, and their action will be described later.

Returning now to the cycling operation, after the record is completely played, the first step in the cycling operation is to lift the pickup arm to its full height from the record to the position shown in Figs. 9 and 11, by downward movement of pull rod 34 driven by a cam (not shown), (and before the top record has been discarded). Thereafter, push rod 38 is moved upwardly, as by another cam in the cycling mechanism. This raises the end **36*a* of wheel arm 36 against the action of spring 39**, which tends to hold the wheel arm in full retracted position, and causes clockwise rotation of the wheel arm with respect to the pickup arm.

The action lowers the wheel arm until it has rotated clockwise to the full extent of its possible movement with respect to the pickup arm, but the wheel 43 still has not engaged the record because in the fully lifted position of the pickup arm, the wheels are not lowered far enough to engage the top record of the stack. Next, pull rod 34 which lifted the tone arm is now gradually released by its cam and the pickup arm lowers until wheel 43 engages the top record. Because of the difference in the diameter or axis height of the wheels, the wheel 43, as previously stated, makes contact with the record, holding wheel 42 off.

It will be noted that these wheels have a different angle with respect to the pickup arm, and the angle of wheel 43 is so chosen, as shown more particularly in Fig. 13, that when the stylus is in starting playing position for a 12'' record, the projected axis of wheel 43 intersects the turntable axis, and similarly the axis of wheel 42 is so aligned that when the stylus is in position to start on a 10'' record, as shown in Fig. 12, the projected axis of wheel 42 intersects the turntable axis.

Assuming now that the pickup arm 30 has been lowered until wheel 43 engages the record, the rotation of the record will cause the wheel 43 to rotate, and this introduces a force on the pickup arm 36 which causes it to swing outwardly about its vertical pivot 44. This force will continue to be applied and the pickup arm will continue to swing until, in the case of a 12'' record, the wheel 43 has reached such a position that its projected axis intersects the projected axis of the turntable. This is a position of equilibrium, and as long as these axes intersect, rotation of the record introduces no force to swing the pickup arm 30, and pickup arm 30 will remain in the position shown in Fig. 13.

The next step in the cycling operation is the gradual downward movement of the pickup arm 30 and retraction of the wheels to place the stylus on the record. The lowering of the pickup arm occurs when the push rod 38 is permitted by its cam actuator to move downward, permitting counterclockwise rotation of the wheel arm 36 with respect to the pickup arm 30 under the pressure of spring 39, until the stylus engages the record. Continued downward movement of push rod 38 after the stylus has engaged the record no longer moves the pickly arm down, but does cause continued counterclockwise rotation of the wheel arm with respect thereto until the wheels are fully retracted. The cycling operation is now complete, and the record will be played in the usual way.

If the record happens to be a 10'' record, the only difference in operation is that before the wheel 43 has reached the position where its axis intersects the turntable axis it will have run off the edge of the 10'' record, as shown in Fig. 15. When this happens, the pickup arm drops a slight amount further in a clockwise direction until wheel 42 comes in contact with the record. Wheel 43 is no longer in contact and takes no further part in the action.

The equilibrium position of the tone arm will be reached when the projected axis of wheel 42 or 43 (whichever is in contact with the record) intersects the projected turntable axis, and this, as has already been stated, is chosen to occur when the tone arm is in starting position for a 10" or 12" record. Why the wheels 42 or 43 cause swinging of the pickup arm when their axes and the turntable axis do not intersect will be clear from an analysis of the action.

Viewed at the portion of the wheel in contact with the record when the pickup arm is out of starting position, a particular spot on the record does not move in the plane of the wheel as it moves past the wheel, but has a diagonal movement toward the outside of the record for any position of the pickup arm inside of starting position. When the pickup arm is in the previously determined starting position, there is no diagonal component, and no force tending to swing the pickup arm.

If for any reason the pickup arm should be carried beyond its starting position (possibly on account of its inertia); i. e., too far out, the pickup arm would be moved inwardly to the position of equilibrium; that is, until the wheel axis and the turntable axis intersect.

To compensate for inaccuracies of manufacture of the mechanism and also to provide for adjustment of the starting position, arms 41 and 42 may be made separate and held in position by clamping screws 46 and 47 as shown in Fig. 17, by means of which the axis of wheels 42 and 43 may be slightly changed. By loosening these screws and varying the axis of either of these wheels with respect to the pickup arm, the starting position may be adjusted through a small distance for either 10" or 12" records independently. The same result may be obtained by slightly bending the arms 40 and 41 in Fig. 15.

While we have shown and described one specific application of the principles of our invention; i. e., as applied to a phonograph, it will be understood that the same principles may be applied in other actuating and positioning mechanisms wherein it is desired to swing an arm or lever over a rotating element and to have the arm or lever always swing to a predetermined position repeatedly with a small degree of error.

It should be understood also that, while in the instances described we have referred to positioning an arm or lever by the action of the wheel or wheels themselves, it is possible to utilize the same principles to have an arm or lever moved by a rotating element to a position in which it engages a fixed stop.

While we have shown and described certain preferred embodiments of our invention, it will be understood that modifications and changes may be made without departing from the spirit and scope thereof, as will be clear to those skilled in the art.

We claim:

1. In an automatic record changing phonograph, in combination, a turntable, a pickup arm pivotally mounted for movement across said turntable and toward and away from said turntable, a wheel arm pivotally mounted on said pickup arm, said wheel arm carrying a pair of wheels at one extremity thereof, means for causing partial rotation of said wheel arm with respect to said pickup arm for extending and retracting said wheels with respect to said pickup arm, said wheels being mounted with their record-engaging portions at different distances from said turntable so that only one at a time may engage the playing face of a record upon said turntable, one of said wheels having its projected axis so positioned as to intersect the projected axis of said turntable when said pickup is in starting position for a 10" record, and the other having its projected axis so positioned as to intersect the projected axis of said turntable when said pickup arm is in starting position for a 12" record said latter wheel having its record-engaging portion closer to the turntable than the first-mentioned wheel.

2. In an automatic record changing phonograph, in combination, a turntable, a pickup arm pivotally mounted for movement across said turntable and toward and away from said turntable, means including a pair of wheels retractably mounted on said pickup arm for engaging the playing face of a record on said turntable and swinging said pickup arm to the starting position of records of different sizes, independently of manual adjustment for the size of each record to be played and means for controlling operation of said last mentioned means said wheels being mounted with their record-engaging portions separated in a direction perpendicular to the plane of the turntable by a distance less than the minimum thickness of one record.

3. The combination claimed in claim 2, in which said wheels are mounted with their axes at different angles with respect to each other.

4. The combination claimed in claim 2, in which said wheels are mounted with their axes at different heights with respect to each other.

5. The combination claimed in claim 2, in which said wheels are of different diameter.

6. The combination claimed in claim 2 in which the axes of said wheels are adjustable in the plane of their respective axes.

7. The combination claimed in claim 2 in which the axes of said wheels are independently adjustable in the plane of their respective axes.

ALONSON E. SCRIVEN.
BLISS VAN EVERY.

REFERENCES CITED

The following references are of record in the file of this patent:

UNITED STATES PATENTS

| Number | Name | Date |
|---|---|---|
| 1,144,219 | Madden | June 22, 1915 |
| 1,418,101 | Simon | May 30, 1922 |
| 1,489,436 | Hess | Apr. 8, 1924 |
| 1,629,986 | Battey et al. | May 24, 1927 |
| 1,895,614 | Elliott | Jan. 31, 1933 |
| 2,094,250 | White | Sept. 28, 1937 |

FOREIGN PATENTS

| Number | Country | Date |
|---|---|---|
| 315,379 | Great Britain | Jan. 30, 1930 |